United States Patent
Biskeborn et al.

(10) Patent No.: US 10,002,627 B2
(45) Date of Patent: *Jun. 19, 2018

(54) TAPE HEAD WITH ELECTRICALLY CONDUCTING SURFACE TO REDUCE TRIBOELECTRIC CHARGING

(71) Applicant: International Business Machines Corporation, Armonk, NY (US)

(72) Inventors: Robert G. Biskeborn, San Jose, CA (US); Johan Engelen, Rueschlikon (CH); Mark A. Lantz, Rueschlikon (CH); Hugo E. Rothuizen, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/685,175

(22) Filed: Aug. 24, 2017

(65) Prior Publication Data

US 2017/0352369 A1 Dec. 7, 2017

Related U.S. Application Data

(63) Continuation of application No. 15/042,642, filed on Feb. 12, 2016.

(51) Int. Cl.
*G11B 5/187* (2006.01)
*G11B 5/40* (2006.01)
*G11B 5/008* (2006.01)
*G11B 5/255* (2006.01)

(52) U.S. Cl.
CPC ............ *G11B 5/40* (2013.01); *G11B 5/00813* (2013.01); *G11B 5/187* (2013.01); *G11B 5/255* (2013.01)

(58) Field of Classification Search
CPC ..... G11B 5/187; G11B 5/255; G11B 5/00813; G11B 5/40
See application file for complete search history.

(56) References Cited

U.S. PATENT DOCUMENTS

| | | |
|---|---|---|
| 3,758,727 A | 9/1973 | Kruklitis |
| 4,025,927 A | 5/1977 | Nelson |
| 4,170,033 A | 10/1979 | Ridgway |
| 4,291,354 A | 9/1981 | Chase |
| 4,356,524 A | 10/1982 | Watanabe |
| 4,656,546 A | 4/1987 | Mallory |
| 4,935,832 A | 6/1990 | Das |
| 5,231,554 A | 7/1993 | Goto |
| 5,652,015 A | 7/1997 | Aboaf et al. |
| 5,654,850 A | 8/1997 | Ganapathi |

(Continued)

FOREIGN PATENT DOCUMENTS

WO 2015016870 A1 2/2015

*Primary Examiner* — Brian Miller
(74) *Attorney, Agent, or Firm* — Harrington & Smith

(57) ABSTRACT

A tape head including a body exhibiting a tape-bearing area is provided. The body includes at least one transducer that is a read element or a write element, configured in the tape head so as for the tape head to read from or write to a magnetic tape, in operation. The tape-bearing area is essentially covered by an electrically conducting layer of material. This way, the exposed surface of the electrically conducting layer essentially forms the tape-bearing surface of the tape head, which surface contacts the magnetic tape, in operation. A tape head apparatus for recording or reproducing multi-track tapes including the tape head is also provided.

10 Claims, 3 Drawing Sheets

(56) References Cited

U.S. PATENT DOCUMENTS

| | | |
|---|---|---|
| 5,663,856 A | 9/1997 | Packard |
| 5,781,377 A | 7/1998 | Koka |
| 5,986,851 A | 11/1999 | Angelo |
| 6,018,444 A | 1/2000 | Beck |
| 6,021,013 A | 2/2000 | Albrecht et al. |
| 6,086,962 A | 7/2000 | Mahoney |
| 6,097,571 A | 8/2000 | Draaisma |
| 6,433,965 B1 | 8/2002 | Gopinathan |
| 6,947,256 B2 | 9/2005 | Biskeborn et al. |
| 7,119,995 B2 | 10/2006 | Granstrom |
| 7,154,709 B2 | 12/2006 | Rao |
| 7,223,922 B2 | 5/2007 | Bandy, IV |
| 7,239,488 B2 | 7/2007 | Zhu |
| 7,773,347 B2 | 8/2010 | Maejima |
| 8,014,100 B2 | 9/2011 | Biskeborn et al. |
| 8,068,300 B2 | 11/2011 | Dugas |
| 8,164,859 B2 | 4/2012 | Imamura |
| 8,547,665 B2 | 10/2013 | Biskeborn |
| 8,665,559 B2 | 3/2014 | Lindig |
| 8,815,060 B2 | 8/2014 | Flint |
| 8,902,720 B1 | 12/2014 | Schreck |
| 9,042,208 B1 | 5/2015 | Knigge |
| 9,245,561 B1 | 1/2016 | Lee |
| 9,311,954 B1 | 4/2016 | Li |
| 2002/0057524 A1 | 5/2002 | Beck |
| 2004/0233586 A1 | 11/2004 | Suda |
| 2008/0112076 A1 | 5/2008 | Biskeborn |
| 2014/0016234 A1 | 1/2014 | Lindig | ially conducting layer essentially forms the tape-bearing surface of the tape head, which surface contacts the magnetic tape, in operation.

According to another aspect, a tape head apparatus is provided for recording and/or reproducing multi-track tapes, comprising a tape head as described above.

Devices and apparatuses embodying the present invention will now be described, by way of non-limiting examples, and in reference to the accompanying drawings.

TAPE HEAD WITH ELECTRICALLY CONDUCTING SURFACE TO REDUCE TRIBOELECTRIC CHARGING

CROSS-REFERENCE TO RELATED APPLICATIONS

This application is a divisional of application Ser. No. 15/042,642, filed Feb. 12, 2016, the disclosure of which is hereby incorporated by reference in its entirety.

BACKGROUND

The invention relates in general to tape heads, more specifically to planar tape heads such as planar servo heads, and apparatuses using such tape heads. In particular, the invention concerns a tape head whose tape-bearing area is covered by an electrically conducting layer to reduce triboelectric charging effects, in operation.

Various data storage media or recording media such as magnetic tape, magnetic disks, optical tape, optical disks, holographic disks or cards, and the like are known which allow for storage and retrieval of data. In particular, in magnetic media, data are typically stored as magnetic transitions, i.e., they are magnetically recorded in the magnetic layer of the media. The data stored is usually arranged in data tracks. A typical magnetic storage medium, such as a magnetic tape, usually includes several data tracks. Data tracks may be written and read individually, or sets of data tracks may be written and read in parallel depending. Transducer (read/write) heads are positioned relative to the data tracks to read/write data along the tracks. To this aim, a tape drive head must locate each data track and accurately follow its path. To achieve this, servo techniques have been developed which allow for a precise positioning of the head relative to the data tracks. One such technique makes use of servo patterns, that is, patterns of signals or recorded marks on the medium, which are tracked by the head. The servo patterns are recorded on the recording medium such as to provide a position reference for the data tracks. In other words, a servo head reads a servo pattern, which is then interpreted by a servo channel into a position error signal (PES). The latter is then used to adjust the distance of the servo head relative to the servo pattern and thereby ensure a proper positioning of the transducers with respect to the set of data tracks.

Essentially two technologies have been developed for timing-based servo patterns. The first one makes use of surface thin film servo writers, as discussed in, e.g., U.S. Pat. No. 6,021,013. The second technology relates to so-called "pure thin film planar servo writers", see, e.g., U.S. Pat. No. 5,652,015, U.S. Pat. No. 6,947,256, and U.S. Pat. No. 8,014,100. Pure thin film planar servo writers potentially have several advantages over surface thin film servo writers, such as improved servo format quality, increased servo formatting speed, increased servo pattern design flexibility and reduced fabrication costs.

SUMMARY

According to a first aspect, a body exhibiting a tape-bearing area is provided. The body comprises at least one transducer that is a read element or a write element, configured in the tape head so as for the tape head to read from or write to a magnetic tape, in operation. The tape-bearing area is essentially covered by an electrically conducting layer of material. This way, the exposed surface of the

Figure 1:
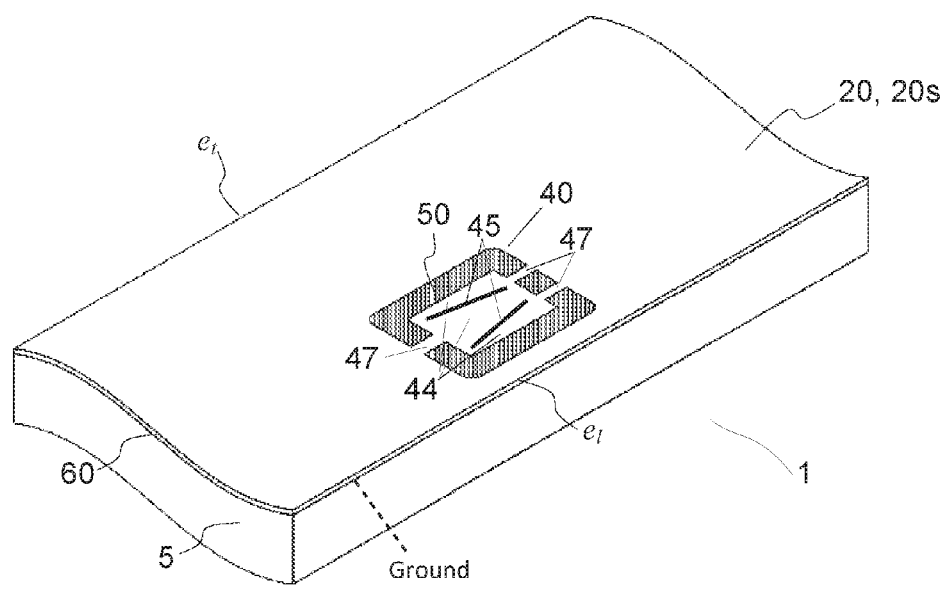
FIG. 1 is a 3D view of a portion of a tape head, according to a first class of embodiments.

The accompanying drawings show simplified representations of devices or parts thereof, as involved in embodiments. Technical features depicted in the drawings are not necessarily to scale. Similar or functionally similar elements in the figures have been allocated the same numeral references, unless otherwise indicated.

DETAILED DESCRIPTION OF EMBODIMENTS OF THE INVENTION

Tape head technologies such as mentioned in the background section generally suffer from high levels of friction and wear. Friction and wear result from the interaction between the tape bearing surface of the head and the tape. Friction is an issue as it results in velocity variations (e.g., during servo formatting) that cause written-in velocity noise and degrade servo performance. The wear of the transducers is also problematic as it limits the useful lifetime of a tape head.

Besides, the use of an electrical insulator or a mixture of isolated regions of electrical insulator and conductors for the tape bearing surface results in tribo-charging (i.e., the generation and build-up of electrical charge due to friction), which causes an increase in friction as tape sticks to and runs over the surface. The forces that result (the contact pressure due to electrostatic attraction and the friction force) increase the wear.

As present inventors have realized, both of these effects can be mitigated by covering or substantially covering the tape bearing surface with an electrically conducting material (and preferably a hard material), to evacuate the charges accumulated by tribo-charging. If necessary, the tape head (and more generally an apparatus equipped with such a tape head) may comprise means to hold the covering layer of material at a fixed electrical potential (e.g., 0V).

The present solutions can notably find applications for planar servo writers (e.g., thin film planar servo writers). However, and the one skilled in the art may appreciate, the present solutions may potentially apply to any type of tape heads and, in particular, to planar data heads for use in tape drives.

Figure 2:
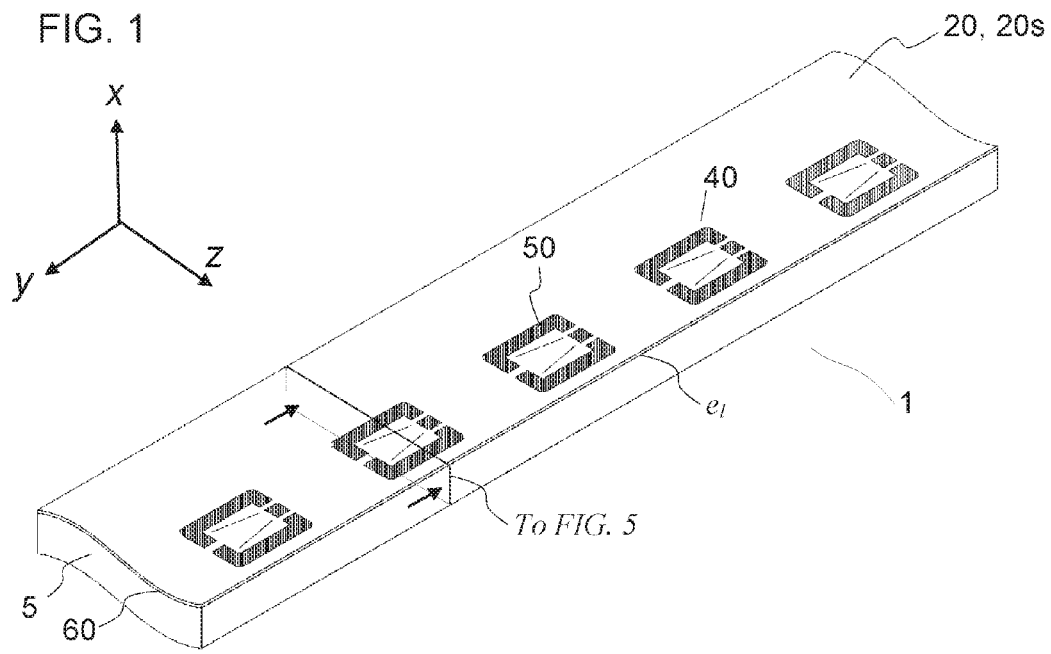
FIG. 2 is a 3D view of an enlarged portion of the tape head of FIG. 1, showing additional servo write elements of the tape head, according to embodiments.
Figure 3:
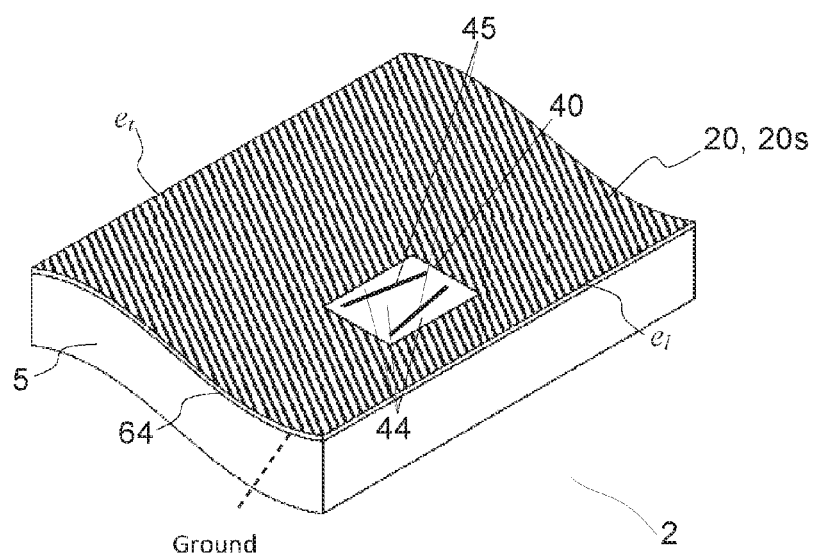
FIG. 3 is a 3D view of a portion of a tape head, according to a second class of embodiments.
Figure 4:
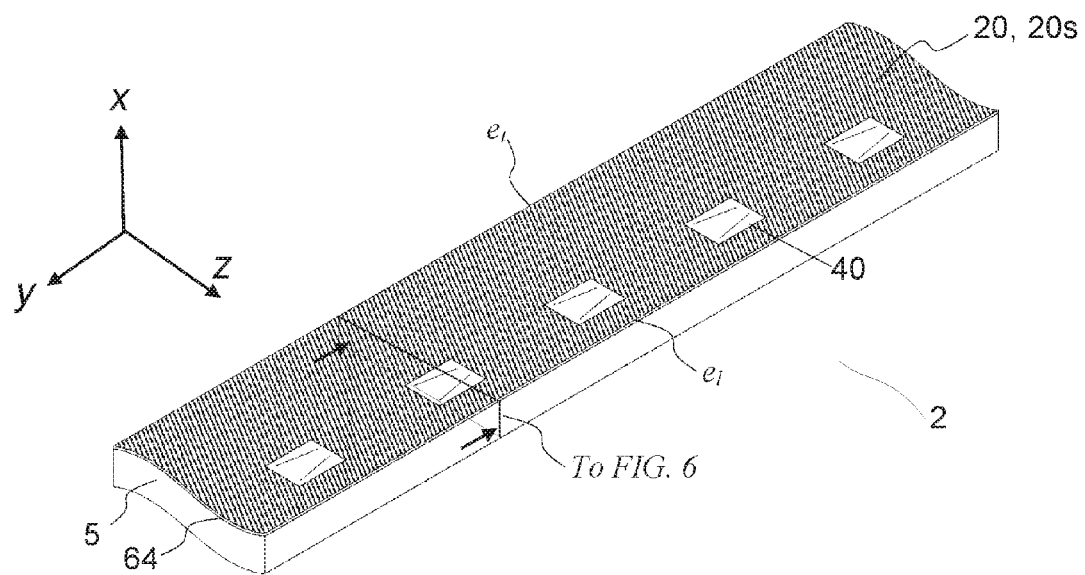
FIG. 4 is a 3D view of an enlarged portion of the tape head of FIG. 3, showing additional servo write elements of the tape head, according to embodiments.

In reference to FIGS. 1-6, general aspects of the certain embodiments are now described, which involve a tape head 1, 2. In FIGS. 1-6, a leading edge is denoted as $e_l$ and a trailing edge is denoted as $e_t$. The tape head has a body 5 exhibiting a tape-bearing area 20, a surface 20s of which is meant to contact a magnetic tape 10, in operation. The body 5 comprises at least one transducer 40. In practice, the body 5 will typically comprise more than one transducers, as illustrated in FIGS. 2 and 4. A transducer can be a read element or a write element, which is configured in the tape head 1, 2 so as for the tape head to be able to read from or write to the tape 10, as known per se.

Remarkably here, the tape-bearing area 20 is essentially covered by an electrically conducting layer 60, 64 of material, such that an exposed surface of this material 60, 64 forms the essential part of the tape-bearing surface, i.e., the surface that comes into contact with the tape 10, in operation.

In other words, most (e.g., more than 95%) of the tape-bearing area is covered by this layer 60, 64, except, in some embodiments, for the top poles of the magnetic yoke 44, 57 of the transducers 40. Still, the layer 60, 64 may be structured so as to form the top poles, as explained in detail below. As a result, most (e.g., more than 95%) of the exposed surface 20s, or even substantially all the exposed surface 20s (i.e., the tape-bearing surface of the head) is formed by said electrically conducting layer 60, 64.

In practice, the layer 60, 64 should preferably have an in-plane electrical resistance that is less than 1 megaohm per square and the electrical resistivity of the layers 60,64 should preferably be less than or equal to 0.1 ohm·meter ($\Omega \cdot m$).

Also, where a soft-magnetic material 60 is used: the coercivity of such a material should preferably be less than 5 oersted (Oe) and more preferably less than 1 Oe.

The layer 60, 64 makes it possible to evacuate charges created through tribo-electric charging (via the layer 60, 64). This is especially advantageous for a tape head comprising islands of material on the tape-bearing area 20. Such islands are indeed sometimes used to help for the fabrication of the head, when depositing and planarizing the surface. The tape bearing surface may for instance comprise aluminum oxide, with small islands of $Ni_{45}Fe_{55}$, located in the vicinity of the top yokes of the transducers.

Figure 5:
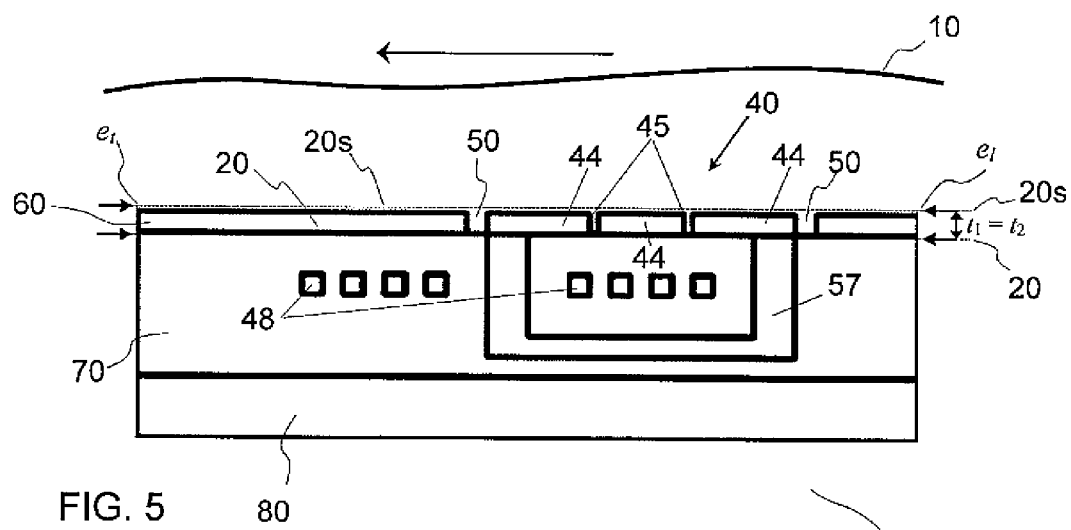
FIG. 5 is a 2D cross-sectional view of the tape head of FIG. 1.
Figure 6:
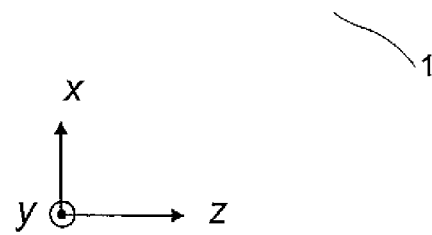
FIG. 6 is a 2D cross-sectional view of the tape head of FIG. 3.
Figure 6:
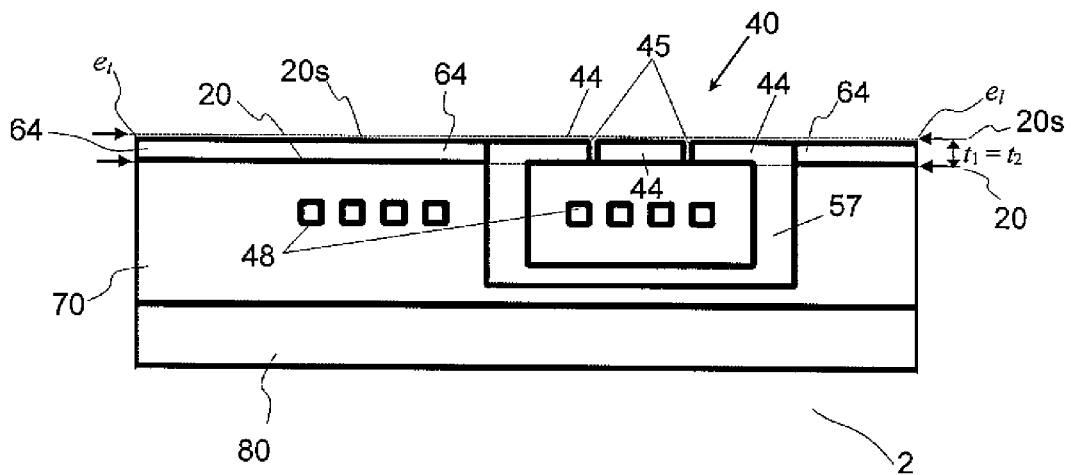

In the examples of FIGS. 5 and 6, the tape-bearing area 20 is indicated by the lower pair of inward, horizontal arrows. The top surfaces of the layers 60, 64 and the top poles 44 define, altogether, the tape-bearing surface 20s of the tape heads 1, 2, as indicated by the upper pair of inward, horizontal arrows in FIGS. 5, 6. FIGS. 5,6 also show an electrical layer 70 (e.g. aluminum oxide), and a substrate 80 upon which the device is fabricated. The substrate 80 may be, for example, a AlTiC wafer.

In embodiments, the thickness of the electrically conducting layer 60, 64 is between 100 nm and 3000 nm. Indeed, the layer 60, 64 should have a certain, minimal thickness to ensure a longer wear life. In addition, layer 60 needs to have a certain thickness to ensure the desired magnetic properties in case it is also used as a top yoke. The layer 60 can notably be used as a coating on top of an existing top yoke (not shown), in which case the thickness of layer 60 could be as small as 100 nm. On the other hand, it can also be used to create the top yoke (as assumed in FIG. 5), in which case it will typically be 1-3 μm thick.

Preferably, the exposed surface of the top poles 44 of the magnetic yoke 44, 57 of the transducer(s) 40 and the exposed surface of the conducting layer 60, 64 are substantially co-planar, to obtain good contact between the tape and the top poles 44. "Substantially co-planar" means that a relative difference between the residual thickness $t_1$ of the top poles 44 (above the plane defined by the area 20) and the thickness $t_2$ of the layer 60, 64 is preferably less than 10 nm. Ideally, the two thicknesses $t_1$ and $t_2$ are the same, as assumed in the accompanying drawings.

As evoked above, present tape heads 1, 2 may further comprise means such as an electrical circuit (in electrical contact with the electrically conducting layer 60, 64) for holding the layer 60, 64 at a controlled electrical potential (preferably 0V, i.e., in an apparatus equipped with present heads the layer 60, 64 is connected to the ground, via such a circuit as represented by the dotted line connecting the layer 60, 64 to 'ground' in FIG. 1 and FIG. 3 for example). This electrical circuit may notably include a wire, below the surface 20, e.g., of the same kind as the wire that connects to the coils) dedicated to grounding the coating 60, 64. The layer 60, 64 can be connected to that wire anywhere on the chip.

Referring now specifically to FIGS. 1, 2 and 6: a first class of embodiments is now described, which concerns a tape head 1 as discussed above, wherein the material of the electrically conducting layer 60 is a soft-magnetic material. Soft magnetic materials are known per se, in particular in the present technical context: they are materials that have a low coercivity, i.e. less than 5 Oe (and preferably less than 1 Oe), such that they can be magnetized but do not tend to stay magnetized.

Said layer 60 may for instance surround the top poles 44 of the magnetic yoke 44, 57 of a transducer 40. I.e., said layer 60 is structured so as to exhibit an aperture for the top poles 44 (the layer 60 does not cover the top poles, which are thus exposed). The write gaps 45 across the top poles are not covered either, i.e., the layer surrounds the whole transducer 40.

The top poles 44 will themselves comprise an electrically conducting, soft-magnetic material. In this respect, since the layer 60 is both electrically conducting and soft-magnetic, the same layer can be used to form the top poles. Namely, said layer 60 may cover buried elements 57, 48 of the transducer(s) 40 and be structured so as to form top poles 44 of the magnetic yoke 44, 57, as better seen in FIG. 5.

However, since the layer 60 is magnetic, this layer 60 is preferably structured (e.g., patterned) so as to ensure a gap 50 around the top poles 44, to improve the performances of the magnetic circuit of the transducer elements. This gap may be empty (i.e., comprise air) or, in variants, a non-magnetic material may be provided to form said gap 50.

In embodiments, the layer 60 is not only structured so as to form the top poles 44 but, in addition, it may be structured to define electrically conducting elements 47 that bridge the top poles 44 to the surrounding layer 60, to allow charges accumulated at the top poles to be evacuated as well, through the surrounding layer 60.

The material of said magnetic, electrically conducting layer 60 may notably be chosen amongst the following materials: NiFe (e.g., $Ni_{45}Fe_{55}$), nitride NiFe (e.g., $Ni_{45}Fe_{55}N$) and FeCo (e.g., comprising 70±5 at. % Fe and 30±5 at. % Co). Nitrided FeCo and FeCo(Ni) may furthermore be used (e.g., comprising 70±5 at. % Fe, 30±5 at. % Co and 2-5 at. % Ni).

Referring now to FIGS. 3, 4 and 6: a second class of embodiments is described, which concerns a tape head 2 wherein the material of the electrically conducting layer 64 is a non-magnetic material. In such cases, the non-magnetic, electrically conducting layer 64 covers essentially all of the tape-bearing area 20 but the transducer area. It does not cover nor form the top poles 44 of the transducer 40. Again, an aperture is provided in the layer 64 so as for the latter to surround the transducer area 40.

The layer 64 may notably abuts the periphery of the top poles 44. Again, the exposed surfaces of the top poles 44 and the surrounding layer 64 are preferably co-planar, so as to form a smooth, flat tape-bearing surface 20s and reduce friction. Possible materials for said layer 64 may notably comprise: TiN, BN, PtSi and doped diamond-like carbon. More generally, non-corroding metals may be used.

Concerning now the possible fabrication methods: layers 60, 64 may be formed using a combination deposition and lift off techniques that are well known. If necessary, the planarity of the final tape bearing surface can be improved using a planarization step (also well known). In variants, layer 60 can be obtained through a simplification of existing fabrication processes, whereby forming layer 60 requires an additional deposition and lift off step, prior to the final planarization step.)

The present heads 1, 2 are preferably planar heads, i.e., heads comprising one or more transducers 40 that comprise top poles in-plane with the tape-bearing coating 20, 20s, as assumed in the accompanying drawings. Present tape heads 1, 2 may notably be servo writers, e.g., pure thin film planar servo writers. Present tape heads 1, 2 can notably be used in tape head apparatuses for recording and/or reproducing multi-track tapes. In exemplary embodiments, an apparatus is provided (not shown). In embodiments, such a tape head apparatus may comprise means to hold the layer 60, 64 at a constant potential, as noted earlier. E.g., the electrically conducting layer 60, 64 may be connected to the ground. In variants, a voltage bias is applied e.g., 0.5 V.

The above embodiments have been succinctly described in reference to the accompanying drawings and may accommodate a number of variants. Several combinations of the above features may be contemplated. Examples are given below.

Concerning the first class of embodiments, present tape heads may are preferably embodied as thin film planar servo writers. The tape bearing area of the servo writer is substantially covered with a material as typically used to fabricate the top poles (e.g., $Ni_{45}Fe_{55}$, FeCo, nitrided $Ni_{45}Fe_{55}$, or nitrided FeCo or FeCo(Ni)) but this material shall preferably be a hard, wear and corrosion resistant material such as nitrided $Ni_{45}Fe_{55}$, nitrided FeCo or FeCo(Ni). In order to improve the performance of the magnetic circuit of the servo write elements, a gap 50 of approximately 5 to 10 microns is formed around the top yokes of the write elements, as illustrated in FIGS. 1, 2 and 5. This gap 50 can be formed by a physical gap (air) or by using a non-magnetic material. In addition, an electrical connection is preferably provided between the top poles of the write elements and the tape bearing surface layer 60, either using sub-surface metal layers or by providing a bridge across the gap 50 around each yoke as illustrated in FIG. 1, or still by using a non-magnetic electrically-conducting material for the gap 50. The tape bearing surface of the top poles and the tape bearing surface of the surrounding conducting layer are substantially co-planar. During operation of the planar servo writer, the conducting top surface layer is held a controlled electrical potential (preferably 0V).

Concerning now the second class of embodiments, the tape bearing surface of the thin film planar servo writer is substantially covered with a non-magnetic, electrically conducting material 64 that is preferably hard, wear resistant and corrosion resistant such as TiN, BN, PtSi, doped diamond-like carbon or non-corroding metals. In this case, a gap between the top poles and the tape bearing coating 64 is not required anymore, as illustrated in FIGS. 3, 4 and 6. The top surfaces of the top yokes and the surrounding conducting layer are again substantially co-planar. During operation of the planar servo writer, the conducting top surface layer is held a controlled potential.

Prototypes have notably been achieved using NiFe, FeCo, FeCoNi (first class of embodiments) and TiN (second class of embodiments). All prototypes have clearly shown that tribo-charging can be eliminated, resulting in a large reduction in friction and in orders of magnitude increase in wear robustness.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated. For example, other materials than those explicitly cited may be used for the electrically conducting layer 60, 64.

What is claimed is:

1. A tape head, comprising:
a body exhibiting a tape-bearing area, the body comprising at least one transducer that is a read element or a write element, configured in the tape head so as for the tape head to read from or write to a magnetic tape, in operation, the at least one transducer comprising a magnetic yoke having one or more top poles,
wherein, the tape-bearing area is essentially covered by an electrically conducting layer of material, such that an exposed surface of said electrically conducting layer essentially forms a tape-bearing surface of the tape head, the tape-bearing surface configured to contact the magnetic tape, in operation, wherein the material of said electrically conducting layer is a non-magnetic, electrically conducting material, and wherein said electrically conducting layer essentially covers the tape-bearing area except for the one or more top poles of the magnetic yoke of said at least one transducer.

2. The tape head of claim 1, wherein
a thickness of the electrically conducting layer is between 100 nm and 3000 nm.

3. The tape head of claim 1, wherein
an exposed surface of the one or more top poles of the magnetic yoke of said at least one transducer and an exposed surface of said electrically conducting layer are substantially co-planar and form a tape-bearing surface of the tape head.

4. The tape head of claim 1, wherein the tape head further comprises means, in electrical contact with the electrically conducting layer for holding the latter at a controlled electrical potential.

5. The tape head of claim 1, wherein:
said electrically conducting layer surrounds and abuts the one or more top poles of the magnetic yoke of said at least one transducer; and
an exposed surface of said one or more top poles and an exposed surface of said conducting layer are substantially co-planar and form a tape-bearing surface of the tape head.

6. The tape head of claim 5, wherein the material of said electrically conducting layer comprises one of: TiN, BN, PtSi, and doped diamond-like carbon.

7. The tape head of claim 1, wherein:
the tape head is a planar tape head; and
the one or more top poles of the magnetic yoke of said at least one transducer are in-plane with the tape-bearing area.

8. The tape head of claim 1, wherein the tape head is a servo writer.

9. An apparatus for recording and/or reproducing multi-track tapes, comprising:
a tape head, wherein the tape head comprises:
a body exhibiting a tape-bearing area, the body comprising at least one transducer that is a read element or a write element, configured in the tape head so as for the tape head to read from or write to a magnetic tape, in operation, the at least one transducer comprising a magnetic yoke having one or more top poles,
wherein, the tape-bearing area is essentially covered by an electrically conducting layer of material, such that an exposed surface of said electrically conducting layer essentially forms a tape-bearing surface of the tape head, the tape-bearing surface configured to contact the magnetic tape, in operation, wherein the material of said electrically conducting layer is a non-magnetic, electrically conducting material, and wherein said electrically conducting layer essentially covers the tape-bearing area except for the one or more top poles of the magnetic yoke of said at least one transducer.

10. The apparatus according to claim 9, wherein said electrically conducting layer is connected to ground.

* * * * *